Jan. 11, 1955

P. M. SAMPATACOS ET AL 2,699,238

DRIVEN MEMBER AND CLUTCH ASSEMBLY

Filed Jan. 11, 1950

INVENTORS
PETER M. SAMPATACOS
STEPHEN W. KLONOSKI

BY S. Jay Teller

ATTORNEY

United States Patent Office 2,699,238
Patented Jan. 11, 1955

2,699,238

DRIVEN MEMBER AND CLUTCH ASSEMBLY

Peter M. Sampatacos and Stephen W. Klonoski, Torrington, Conn., assignors to The Torrington Manufacturing Company, Torrington, Conn., a corporation of Connecticut Application January 11, 1950, Serial No. 137,912

9 Claims. (Cl. 192—45)

The invention relates to a driven member and clutch assembly. The driven member is preferably a blower wheel, and more particularly a blower wheel adapted for use in an oil burner but not necessarily so limited.

An oil burner ordinarily includes an oil pump and a blower wheel both driven by the same electric motor. The blower wheel delivers air to a blast tube and the pump is connected with a nozzle which is near the discharge end of the blast tube and which atomizes the oil and mixes it with the air delivered through the tube. When the motor is de-energized it is rapidly decelerated and stopped by reason of its connection to the oil pump. However, notwithstanding the rapid deceleration of the motor and of the pump, a small residue of oil is discharged by the nozzle, and it is important that the supply of air be continued for a few seconds in order to insure complete combustion of all of the oil. In order that the blower wheel may continue to rotate, notwithstanding the rapid deceleration of the motor, it has been heretofore proposed to drive the blower wheel by means of an overrunning clutch.

One of the objects of the present invention is to provide a driven member and clutch assembly wherein the clutch is of the overrunning type and is so related to the driven member and so constructed that it is effective and reliable and is adapted for manufacture and assembly at low cost.

A further object of the invention is to provide an assembly of the type referred to wherein certain parts of the clutch are adapted to be assembled in relatively reversed positions so that the driven member can be operated in either direction as required. The operation in either direction is effected without any alternative or substitute parts.

Other objects of the invention will be apparent from the drawing and from the following description and claims.

In the drawing we have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Figure 1:
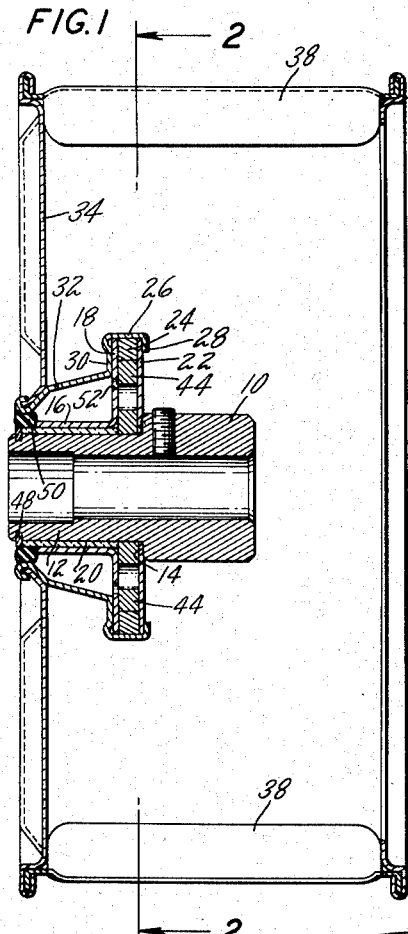
Fig. 1 is a central longitudinal sectional view of a driven member and clutch assembly embodying the invention, the driven member being shown as a blower wheel and the section being taken along the line 1—1 of Fig. 2.

Referring to the drawing, 10 is a rotatable hub having a central bore for receiving a supporting and driving shaft which may be the shaft of an electric motor. The hub has a concentric cylindrical portion 12 and an adjacent shoulder 14. A threaded hole is provided in the hub for receiving a set screw by means of which the hub is secured to the shaft.

Supported on the cylindrical portion 12 of the hub and rotatable thereon is a supporting means for the hereinafter described clutch ring which supporting means is preferably a composite structure as will be apparent from the following description. The supporting means includes a supporting member 16 which is rotatably supported on the cylindrical portion of the hub. The supporting member has a face which is perpendicular to the axis of rotation. As shown the supporting member comprises a sleeve 16 and it also comprises a flange 18 integral with the sleeve at the inner end thereof and perpendicular to the axis of rotation. The before-mentioned perpendicular face is on the flange 18. Preferably, an oilless bearing sleeve 20 is interposed between the sleeve 16 and the cylindrical portion 12 of the hub. The supporting means also includes a second supporting member which is a centrally apertured disc 22 surrounding the hub and perpendicular to the axis of rotation. The second supporting member or disc is structurally separate from the first supporting member and is longitudinally spaced therefrom and more particularly is longitudinally spaced inwardly from the flange 18 of the first supporting member.

A ring 24 is provided which is structurally separate from the supporting means, the ring surrounding the hub and being concentric with the cylindrical portion thereof. When the supporting means includes a supporting member with a flange 18 having a perpendicular face and also includes a second supporting member or disc 22, the said ring is positioned between the said face on the flange and the said disc.

The supporting means as shown further includes an annular connecting member 26, this being preferably formed of sheet metal. The annular member 26 embraces the ring 24 and the flange 18 and the second supporting member or disc 22 and serves to press them together longitudinally so that the ring is rigidly connected with the said flange and disc for unison therewith. As shown, the annular connecting member 26 comprises a flange 28 engaging the disc 22, a flange 30 engaging the flange 18 and an outwardly projecting longitudinal extension 32. The before-mentioned supporting means comprises the said supporting first member, the said second supporting member or disc 22 and the said annular connecting member 26.

A driven member is provided which is preferably a blower wheel of any usual or preferred construction. Preferably and as shown, the driven member or blower wheel comprises a centrally apertured end plate 34 and an end ring 36 and an annular series of longitudinal blades 38, 38 connected between the end plate 34 and the end ring 36. The end plate 34 of the blower wheel serves as the means for connecting the blower wheel with the supporting means. The driven member or blower wheel may be variously mounted on the supporting means, but when the supporting means includes an annular member such as 26, the outer end portion of the extension 32 projects through and fits the aperture in the end plate 34, being rigidly connected therewith.

The said ring 24 is formed with a plurality of similar circumaxially spaced interior recesses 40, 40 each having an inwardly exposed face 42 which is eccentric with respect to the hub. Positioned at least partly within the respective ring recesses 40, 40 are similar rollers 44, 44. When the supporting means comprises a flange 18 and a disc 22, the recesses in the ring are open-ended and the rollers are positioned between the said flange and disc and are thus held against longitudinal movement. The said rollers 44, 44 are of such diameter as to be engageable with the cylindrical portion 12 of the hub and with the respective eccentric faces 42, 42 of the ring recesses, the rollers thus cooperating with the hub and the ring to constitute an overrunning clutch.

Located at least in part within the respective ring recesses and engaging the respective rollers are springs 46, 46. Preferably and as shown, the springs 46, 46 are U-shaped leaf springs each having one leg engaging with the corresponding roller and having the other leg engaging with a face of the recess. The springs 46, 46 serve to bias the respective rollers into engagement with the hub and with the corresponding eccentric recess faces 42, 42. When the parts are assembled as shown in Figs.

Figure 2:
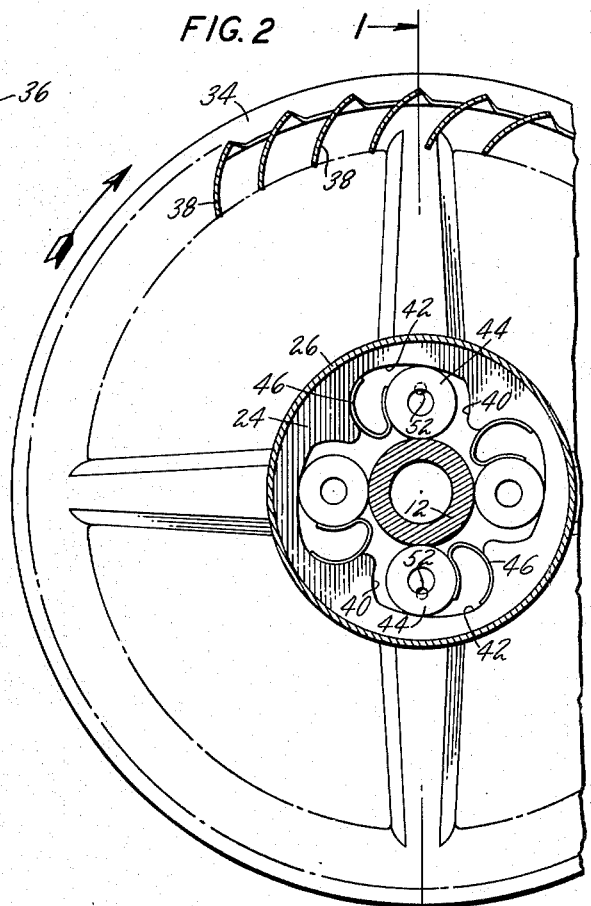
Fig. 2 is a fragmentary transverse sectional view taken along the line 2—2 of Fig. 1, with most of the blower wheel blades omitted for the sake of simplicity.

1 and 2, rotation of the hub 10 in the clockwise direction as viewed in Fig. 2 serves in cooperation with the springs 46, 46 to force the rollers into engagement with the recess faces 42, 42 so that the rollers serve to drive the ring 24 and the parts connected therewith in the direction of hub rotation, that is, in the clockwise direction. However, the ring and the parts connected therewith are free to rotate in the said clockwise direction independently of the hub.

The disc 22 engages the shoulder 14 of the hub, the shoulder thus serving to prevent inward movement of the supporting means and of the driven member or blower wheel carried thereby. Secured to the hub near the outer end thereof is a washer 48 which serves to prevent outward movement of the supporting means of the driven member or blower wheel carried thereby. As shown, the washer 48 engages the outer end of the bearing sleeve 20. The inner end of the sleeve engages the ring 24 and thus the washer serves indirectly to prevent outward movement of the supporting means.

It will be observed that the extension 32 of the annular member is connected with the inner edge of the flange 30 and is of reduced diameter at its outer end. Thus the ring 24 has an exterior diameter which is much greater than the diameter of the aperture in the end plate 34. The provision of a relatively large ring makes it possible to provide relatively large rollers 44, 44. The large ring and the large rollers insure reliable and effective driving of the ring and attached parts by the hub.

The supporting members 18 and 22, the bearing bushing 20, the connecting member 26 and the rollers 44, 44 with their springs 46, 46 collectively constitute a clutch unit which is held against longitudinal movement by means of the hub shoulder 14 and the washer 22. The driven member is carried entirely by this clutch unit for rotation in unison therewith.

Preferably a means is provided for closing the annular space between the outer end of the sleeve 16 and the outer end of the extension 32. As shown, there is provided for this purpose a ring 50 formed of a suitable elastic or resilient material which is resistant to oil or grease. The ring 50 is forced into place and frictionally held. As shown, the bearing sleeve 20 extends outward beyond the end of the sleeve 16 and the ring 50 is interposed between the bearing sleeve 20 and the extension 32. The closing means, such as the ring 50, provides an enclosed annular space bounded by the sleeve 16, the flange 18, the extension 32 and the ring 50. This space may be filled with a suitable grease or other lubricant. One or more holes 52, 52 are provided in the flange 18 in order to permit small quantities of grease from the said annular chamber to reach the rollers 44, 44. The bearing sleeve 20 requires no lubrication, and any required lubrication for the rollers is provided by the grease passing through the holes 52, 52. By reason of this construction the assembly can be operated for an indefinite period without supplemental lubrication. When the supply of grease or other lubricant in the annular space is depleted, it can be replenished by first removing the ring 50.

Figure 3:
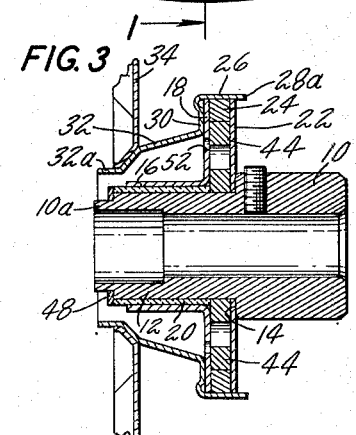
Fig. 3 is a fragmentary view similar to the central portion of Fig. 1 but showing the parts in intermediate positions of assembly.

Fig. 3 shows the parts in intermediate positions of assembly. The flange 28 of the supporting member 26 extends longitudinally inward as shown at 28ᵃ. The outer end of the extension 32 of the annular member extends longitudinally outward as shown at 32ᵃ. The outer end of the hub 10 extends longitudinally outward as shown at 10ᵃ. With the several parts of the supporting means and of the clutch preliminarily assembled, the portion 28ᵃ of the supporting member 26 is spun over to provide the flange 28, the said flange engaging the disc 22 with sufficient force to firmly clamp the ring 24 between the disc 22 and the flange 18. With the blower wheel preliminarily assembled with the extension 32 the outer end portion 32ᵃ of the said extension is spun over to firmly engage the end plate 34 of the driven member or blower wheel so as to rigidly connect the said end plate with the said extension. With the supporting means and the bearing sleeve 20 and the washer 48 preliminarily assembled with the hub, the outer end portion 10ᵃ of the hub is spun over to engage the washer to firmly engage it and to thus prevent relative outward movement of the various parts. The several operations last above-described are not necessarily performed in the stated sequence.

Figure 4:
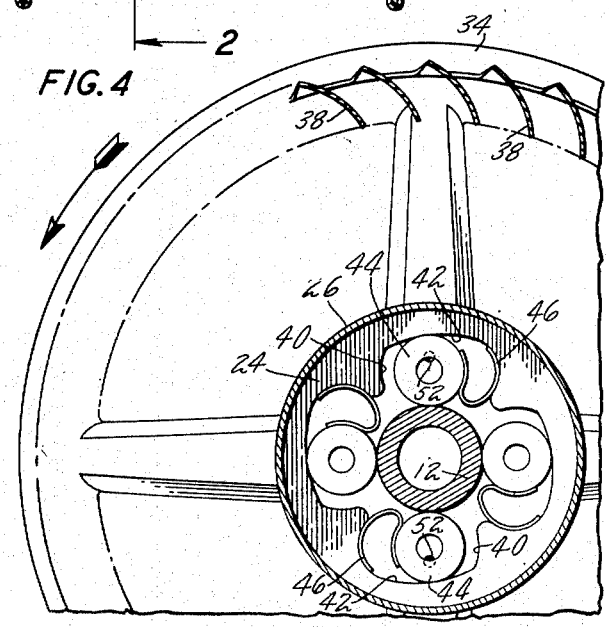
Fig. 4 is a fragmentary view similar to Fig. 2 but showing some of the parts in relatively reversed positions.

Fig. 4 is similar to Fig. 2 but it illustrates the fact that the ring 40 may be assembled with the other parts in a relatively reversed position. This is necessary when the driven member or blower wheel is required to rotate in the counterclockwise direction instead of in the clockwise direction. It will be apparent that by merely reversing the positions of the ring 24 and of the springs during assembly the over-running clutch may be effective for driving the driven member or blower wheel in either direction as required.

The invention claimed is:

1. The combination of a rotatable hub having a concentric cylindrical portion adjacent the outer end thereof and having an outwardly facing annular shoulder spaced from the said outer end, an overrunning clutch unit carried by and relatively rotatable on the said cylindrical portion of the hub which unit includes spring pressed rollers engageable with the said cylindrical hub portion for rotating the clutch unit in one direction when the hub is rotated in the said direction while leaving the said clutch unit free to rotate in the said direction independently of the hub, the said clutch unit directly engaging the hub shoulder to prevent longitudinal movement in the inward direction, means fixedly connected with the hub near the outer end thereof and directly engaging the clutch unit for preventing longitudinal movement of the said clutch unit in the outward direction, and a driven member connected with the clutch unit for rotation in unison therewith which driven member is supported entirely by the clutch unit and is free from direct engagement with the hub.

2. The combination of a rotatable hub having a concentric cylindrical portion adjacent the outer end thereof and has an outwardly facing annular shoulder spaced from the said outer end, a washer connected with and surrounding the hub near the outer end thereof, a supporting member carried by the cylindrical portion of the hub and rotatable relatively thereto which member has a face perpendicular to the axis of rotation, a centrally apertured disc surrounding the cylindrical portion of the hub and rotatable relatively thereto which disc is perpendicular to the axis of rotation and is longitudinally spaced from the supporting member and rigidly connected therewith, the said supporting member and the said connected disc being interposed between the said washer and the said hub shoulder which cooperate to prevent longitudinal movement of the said member and disc, a driven member rigidly connected to the supporting member and the disc and rotatable in unison therewith, a ring surrounding the cylindrical portion of the hub and concentric therewith which ring is positioned between the disc and the said face on the supporting member and is connected with the said disc and supporting member for rotation therewith, the said ring being formed with a plurality of similar circumaxially spaced interior open-ended recesses each having an inwardly exposed face eccentric with respect to the hub, and a plurality of similar spring pressed rollers at least partly within the respective ring recesses which rollers are retained against longitudinal movement by the disc and by the said face on the supporting member and are of such diameter as to be engageable with the cylindrical portion of the hub and with the respective eccentric faces of the ring recesses, the said rollers serving to rotate the ring and the parts connected therewith in one direction when the hub is rotated in the said direction while leaving the said ring and connected parts free to rotate in the said direction independently of the hub.

3. The combination of a rotatable hub having a central bore for receiving a supporting and driving shaft and having a concentric cylindrical portion, a rotatable driven member concentric with the hub and having a centrally apertured end plate, a supporting means carried by the cylindrical portion of the hub and freely rotatable relatively thereto, the outer end portion of the supporting means extending through the aperture in the end plate and being rigidly secured to the said end plate, a ring rigidly secured to the supporting means adjacent the inner end thereof and surrounding the cylindrical portion of the hub which ring is structurally separate from the supporting means and has an exterior diameter substantially larger than that of the said outer end portion of the supporting means, the said ring being formed with a plurality of similar circumaxially spaced interior recesses each having an inwardly exposed face eccentric with respect to the hub, and a plurality of similar spring pressed rollers at least partly within the respective ring recesses and of such diameter as to be engageable with the cylindrical portion of the hub and with the respective eccentric faces of the ring recesses, the said rollers serving to rotate the ring and the parts connected therewith in one direction when the hub is rotated in the said direction while leaving the said ring and connected parts free to rotate in the said direction independently of the hub.

4. The combination of a rotatable hub having a central bore for receiving a supporting and driving shaft and having a concentric cylindrical portion, a supporting member carried by the cylindrical portion of the hub and rotatable relatively thereto which member has a face perpendicular to the axis of rotation, a driven member rigidly connected to the supporting member and rotatable in unison therewith, a centrally apertured disc surrounding the hub and rotatable relatively thereto which disc is perpendicular to the axis of rotation and is structurally separate from the supporting member and longitudinally spaced from the said face thereof, a ring surrounding the cylindrical portion of the hub and concentric therewith which ring is positioned between the disc and the said face on the supporting member, the said ring being formed with a plurality of similar circumaxially spaced interior open-ended recesses each having an inwardly exposed face eccentric with respect to the hub, means for rigidly connecting the ring with the disc and the supporting member, and a plurality of similar spring pressed rollers at least partly within the respective ring recesses which rollers are retained against longitudinal movement by the disc and the said face of the supporting member and which rollers are of such diameter as to be engageable with the cylindrical portion of the hub and with the respective eccentric faces of the ring recesses, the said rollers serving to rotate the ring and the parts connected therewith in one direction when the hub is rotated in the said direction while leaving the said ring and connected parts free to rotate in the said direction independently of the hub.

5. The combination of a rotatable hub having a central bore for receiving a supporting and driving shaft and having a concentric cylindrical portion, a supporting member carried by the cylindrical portion of the hub and rotatable relatively thereto which member has a face perpendicular to the axis of rotation, a driven member rigidly connected to the supporting member and rotatable in unison therewith, a centrally apertured disc surrounding the hub and rotatable relatively thereto which disc is perpendicular to the axis of rotation and is structurally separate from the supporting member and longitudinally spaced from the said face thereof, a ring surrounding the cylindrical portion of the hub and concentric therewith which ring is positioned between the disc and the said face on the supporting member, the said ring being formed with a plurality of similar circumaxially spaced interior open-ended recesses each having an inwardly exposed face eccentric with respect to the hub, means for rigidly connecting the ring with the disc and with the supporting member in either of two relatively reversed positions, a plurality of similar rollers at least partly within the respective ring recesses which rollers are retained against longitudinal movement by the disc and the said face on the supporting member, the said rollers being of such diameter as to be engageable with the cylindrical portion of the hub and with the respective eccentric faces of the ring recesses, and a plurality of springs at least partly within the respective ring recesses and engaging the respective rollers to bias them into engagement with the hub and with the respective eccentric recess faces so that the ring and the parts connected therewith are driven by the rotatable hub and by the rollers in one direction or in the opposite direction according to the relative position of the ring and so that the said ring and the parts connected therewith are free to rotate independently of the hub in the same direction in which they are driven by the hub and the rollers.

6. The combination of a rotatable hub having a central bore for receiving a supporting and driving shaft and having a concentric cylindrical portion, a supporting member comprising a sleeve carried by the cylindrical portion of the hub and rotatable relatively thereto and also comprising a flange integral with the sleeve and perpendicular to the axis of rotation, a driven member rigidly connected to the supporting member and rotatable in unison therewith, a centrally apertured disc surrounding the hub and rotatable relatively thereto which disc is perpendicular to the axis of rotation and is structurally separate from the supporting member and longitudinally spaced therefrom, a ring surrounding the cylindrical portion of the hub and concentric therewith which ring is positioned between the flange and the disc, the said ring being formed with a plurality of similar circumaxially spaced interior open-ended recesses each having an inwardly exposed face eccentric with respect to the hub, an annular member embracing the flange and the ring and engaging the disc which member serves to press the flange and the disc longitudinally toward each other and into engagement with the ring so that the ring is rigidly connected with the said flange and disc, and a plurality of similar spring pressed rollers at least partly within the respective ring recesses which rollers are retained against longitudinal movement by the flange and the disc and which rollers are of such diameter as to be engageable with the cylindrical portion of the hub and with the respective eccentric faces of the ring recessses, the said rollers serving to rotate the ring and the parts connected therewith in one direction when the hub is rotated in the said direction while leaving the said ring and connected parts free to rotate in the said direction independently of the hub.

7. The combination of a rotatable hub having a central bore for receiving a supporting and driving shaft and having a concentric cylindrical portion, a supporting member comprising a sleeve carried by the cylindrical portion of the hub and rotatable relatively thereto and also comprising a flange integral with the sleeve and perpendicular to the axis of rotation, a centrally apertured disc surrounding the hub and perpendicular to the axis of rotation which disc is structurally separate from the supporting member and longitudinally spaced therefrom, a ring surrounding the cylindrical portion of the hub and concentric therewith which ring is positioned between the flange and the disc and is rigidly connected therewith, the said ring being formed with a plurality of similar circumaxially spaced interior open-ended recesses each having an inwardly exposed face eccentric with respect to the hub, an annular member connected with the flange and the disc for rotation in unison therewith, a driven member rigidly connected to the said annular member and rotatable in unison therewith, and a plurality of similar spring pressed rollers at least partly within the respective ring recesses which rollers are retained against longitudinal movement by the flange and the disc and are of such diameter as to be engageable with the cylindrical portion of the hub and with the respective eccentric faces of the ring recesses, the said rollers serving to rotate the ring and the parts connected therewith in one direction when the hub is rotated in the said direction while leaving the said ring and connected parts free to rotate in the said direction independently of the hub.

8. The combination as set forth in claim 7, wherein the driven member has a centrally apertured end plate, and wherein the outer end of the annular member extends through the aperture in the end plate and is rigidly secured to the said end plate.

9. The combination as set forth in claim 8, wherein the flange of the supporting member has at least one hole therein, and wherein means is provided for closing the annular space between the outer ends of the supporting member and of the annular member, the said closing means providing an annular grease retaining chamber from which grease can pass to the rollers through the said hole in the flange of the supporting member.

References Cited in the file of this patent

UNITED STATES PATENTS

| | | |
|---|---|---|
| 300,503 | Rascoe | June 17, 1884 |
| 800,853 | Kimball | Oct. 3, 1905 |
| 1,039,099 | Cook | Sept. 24, 1912 |
| 1,129,174 | Dennis | Feb. 23, 1915 |
| 1,646,897 | Burns | Oct. 25, 1927 |
| 1,798,383 | Roberds | Mar. 31, 1931 |
| 1,921,719 | Allen | Aug. 8, 1933 |
| 2,402,725 | Birkigt | June 25, 1946 |